Patented Aug. 2, 1938

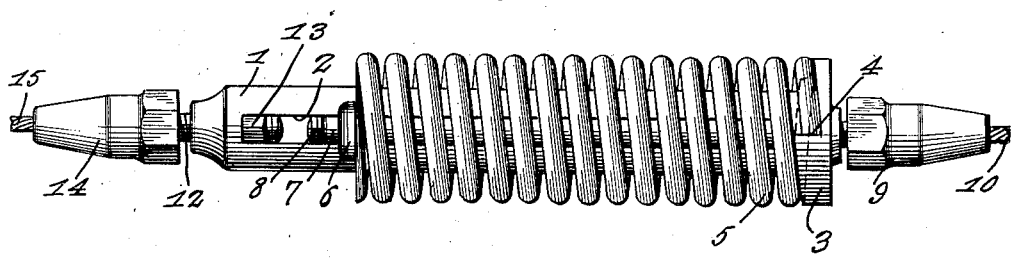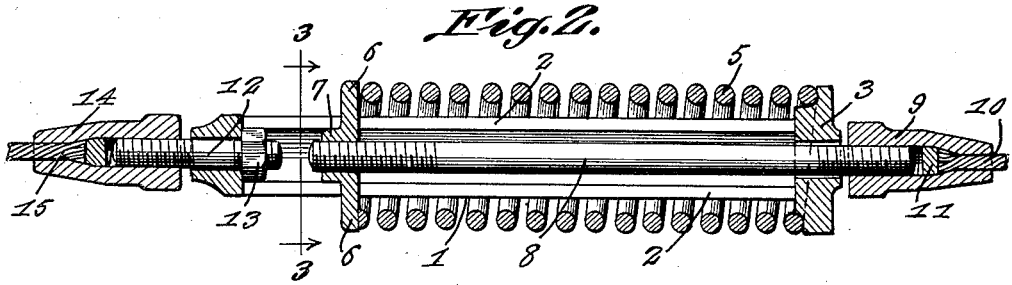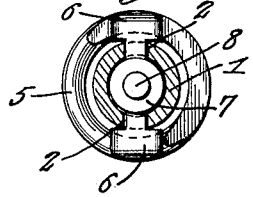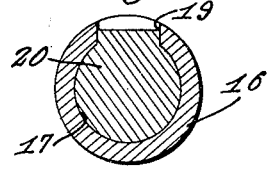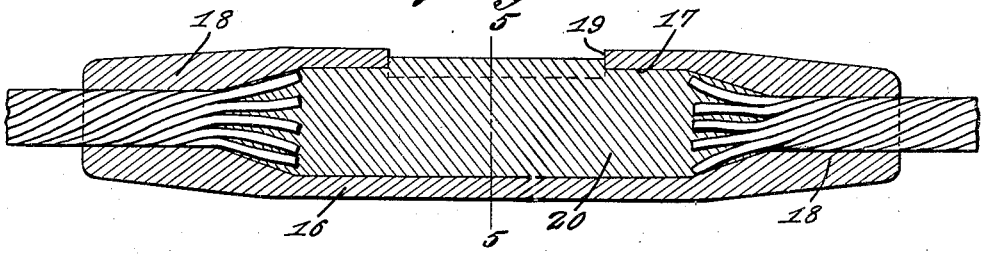

2,125,303

UNITED STATES PATENT OFFICE 2,125,303

SAFETY BARRIER

Samuel L. McRoberts, Pittsburgh, Pa.

Application July 30, 1936, Serial No. 93,499

1 Claim. (Cl. 267—72)

This invention relates to barriers, and its general object is to provide a safety barrier of the cable type for use along dangerous curves and embankments of roadways to prevent vehicles from going off the road, and an important object is to provide a shock absorber for such barriers, to not only prevent damage thereto, in the event the vehicle should hit the cables, but also to deflect the vehicle back on the roadway, with none or minimum damage thereto.

A further object of the invention is to provide a shock absorber for a cable type barrier that also acts in the capacity of an equalizer to compensate for expansion and contraction thereby preventing the posts and other parts of the barrier from becoming loose, with the result the cables will be retained in a taut condition at all times.

Another object is to provide a shock absorber for barrier cables that can be used as a splicing device therefor, yet the shock absorber can be disposed at the ends of the cables for connecting the same to the posts of the barrier.

A still further object is to provide a non-resilient splicing device for the cables, for use in combination with my shock absorber or equalizer.

Another object is to provide a shock absorber for use with barriers of the cable type, that is simple in construction, inexpensive to manufacture, easy to install and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side elevation of my shock absorber.

Figure 2 is a longitudinal sectional view taken therethrough.

Figure 3 is a sectional view taken approximately on line 3—3 of Figure 2, looking in the direction of the arrows.

Figure 4 is a longitudinal sectional view taken through my cable splicing device.

Figure 5 is a sectional view taken approximately on line 5—5 of Figure 4.

Referring to the drawing in detail, and particularly to Figures 1 to 3 inclusive, it will be noted that my shock absorber includes an elongated tubular body 1 that is longitudinally slotted as at 2 for the major portion of its length, with the slots arranged in the wall thereof for disposal diametrically opposite each other, as best shown in Figure 3.

One end of the body is enlarged to provide a collar 3 having an opening therethrough, and the collar has a spiral groove on its inner face which terminates in a shoulder 4 to act as an abutment for one end of a coil spring 5 which surrounds the body and has its opposite end convolution engageable with opposed lugs 6 formed on and extending from diametrically opposite sides of a nut 7 which is arranged within the body. The lugs 6 include reduced portions that extend through the slots 2 for disposing the enlarged portions of the lugs exteriorly of the body to act as abutment means for the coil spring, as clearly shown in Figures 2 and 3 of the drawing.

Threadedly mounted in the nut 7 is one threaded end of a rod 8 which extends through the opening in the collar 3, and the outer end of the rod 8 is threaded to threadedly receive a cable connector sleeve 9 which is provided with a square cornered head at one end, for the application of a wrench or the like thereto, while its opposite end is reduced and has one end of a cable section 10 mounted therein and secured accordingly by Babbitt metal, lead or the like 11.

The end of the body opposed to the collar 2 has an opening therein of a size to provide a shoulder within the body, and extending through the opening is a screw bolt 12 having threaded ends, with one threaded end within the body and having a nut 13 thereon engageable with the shoulder, as clearly shown in Figure 2, while the opposite threaded end of the bolt 12 has threadedly secured thereto a cable connector sleeve 14 similar to the sleeve 9. The sleeve 14 likewise has secured therein a cable section 15 by lead or the like.

While I have illustrated my shock absorber as connecting the cable sections 10 and 15 with respect to each other, it will be obvious that the shock absorber may be disposed at the ends of the sections for connecting the latter to a post or the like, and it will be further obvious that the shock absorber not only holds the barrier cable sections taut, but in the event pressure is applied thereto, such as by a vehicle hitting the cables, the spring is put under compression, thereby absorbing the shock of the impact of the hit, and on the rebound the vehicle will be deflected back into the roadway, with minimum damage, if any to the vehicle and barrier.

In Figures 4 and 5 I have illustrated a splicing device for barrier cables, which as best shown in Figure 4, is in the form of a tubular body 16 having a chamber 17 therein and reduced ends 18 provided with bores communicating with the chamber, the bores being adapted to receive the ends of cable sections, with their ends terminating within the reduced opposed ends of the chamber 17.

The chamber 17 is provided with an elongated opening 19, whereby Babbitt metal, lead or the like 20 may be poured within the chamber for securing the cable ends therein, and the cable ends are preferably unraveled, as shown so that the metal will flow between the strands, as clearly shown in Figure 4.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

In a cable type highway barrier, a shock absorber for the cables thereof and comprising an elongated hollow body having opposed slots therein and extending longitudinally for the major portion of the length thereof, a coil spring surrounding the body, a collar fixed to one end of the body and having a spiral groove in its inner face terminating in a shoulder providing abutment means for one end of the coil spring mounted in the groove, a nut disposed within the body, lugs extending from diametrically opposite sides of the nut and having reduced inner portions passing through the slots for slidable movement therein longitudinally of the body, enlarged outer ends for the lugs and receiving the opposite end of the coil spring to act as an abutment means therefor, a rod threaded in the nut and extending through one end of the body for connecting a cable thereto or for connection to suitable supporting means, a bolt secured to and extending through the opposite end of the body and cable connecting means detachably secured to the bolt.

SAMUEL L. McROBERTS.